United States Patent
Gallagher et al.

(10) Patent No.: US 10,794,192 B2
(45) Date of Patent: Oct. 6, 2020

(54) GAS TURBINE ENGINE AIRFOIL

(71) Applicant: United Technologies Corporation, Farmington, CT (US)

(72) Inventors: Edward J. Gallagher, West Hartford, CT (US); Byron R. Monzon, Cromwell, CT (US); Ling Liu, Glastonbury, CT (US); Linda S. Li, Middlefield, CT (US); Darryl Whitlow, Middletown, CT (US); Barry M. Ford, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 420 days.

(21) Appl. No.: 16/048,981

(22) Filed: Jul. 30, 2018

(65) Prior Publication Data
US 2019/0063227 A1    Feb. 28, 2019

Related U.S. Application Data (63) Continuation of application No. 14/624,666, filed on Feb. 18, 2015, now Pat. No. 10,036,257.

(60) Provisional application No. 61/942,023, filed on Feb. 19, 2014.

(51) Int. Cl.
| | |
|---|---|
| *F01D 5/14* | (2006.01) |
| *F01D 5/02* | (2006.01) |
| *F01D 15/12* | (2006.01) |
| *F02C 3/14* | (2006.01) |
| *F02C 3/04* | (2006.01) |

(52) U.S. Cl.
CPC ............... *F01D 5/141* (2013.01); *F01D 5/02* (2013.01); *F01D 15/12* (2013.01); *F02C 3/04* (2013.01); *F02C 3/14* (2013.01); *F05D 2220/32* (2013.01); *F05D 2220/36* (2013.01); *F05D 2250/71* (2013.01); *Y02T 50/672* (2013.01); *Y02T 50/673* (2013.01)

(58) Field of Classification Search
CPC ............... F01D 5/12; F01D 5/14; F01D 5/141
See application file for complete search history.

(56) References Cited

U.S. PATENT DOCUMENTS

| | | | |
|---|---|---|---|
| 7,114,911 B2 | 10/2006 | Martin et al. | |
| 2005/0031454 A1* | 2/2005 | Doloresco | F01D 5/141 |
| | | | 416/238 |
| 2008/0131271 A1 | 6/2008 | Wood et al. | |
| 2012/0243983 A1 | 9/2012 | Breeze-Stringfellow et al. | |

* cited by examiner

*Primary Examiner* — Richard A Edgar
*Assistant Examiner* — Maxime M Adjagbe
(74) *Attorney, Agent, or Firm* — Carlson, Gaskey & Olds, P.C.

(57) ABSTRACT

An airfoil for a turbine engine includes an airfoil having pressure and suction sides extending in a radial direction from a 0% span position at an inner flow path location to a 100% span position at an airfoil tip. The airfoil has a curve corresponding to a relationship between a trailing edge sweep angle and a span position. The trailing edge sweep angle is in a range of 0° to 10° in a range of 10-20% span position. The trailing edge sweep angle is in a range of the trailing edge sweep angle is positive from 0% span to at least 95% span.

30 Claims, 6 Drawing Sheets

GAS TURBINE ENGINE AIRFOIL

CROSS-REFERENCE TO RELATED APPLICATION

This application is a continuation of U.S. application Ser. No. 14/624,666 filed on Feb. 18, 2015, which claims priority to U.S. Provisional Application No. 61/942,023 filed on Feb. 19, 2014.

BACKGROUND

This disclosure relates generally to an airfoil for gas turbine engines, and more particularly to the leading and trailing edge sweep for a fan or compressor blade.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The propulsive efficiency of a gas turbine engine depends on many different factors, such as the design of the engine and the resulting performance debits on the fan that propels the engine. As an example, the fan may rotate at a high rate of speed such that air passes over the fan airfoils at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

In one exemplary embodiment, an airfoil for a turbine engine includes an airfoil having pressure and suction sides extending in a radial direction from a 0% span position at an inner flow path location to a 100% span position at an airfoil tip. The airfoil has a curve corresponding to a relationship between a trailing edge sweep angle and a span position. The trailing edge sweep angle is in a range of 0° to 10° in a range of 10-20% span position. The trailing edge sweep angle is positive from 0% span to at least 95% span.

In a further embodiment of the above airfoil, the trailing edge sweep angle is in a range of 10° to 20° in a range of 40-70% span position.

In a further embodiment of any of the above airfoils, the trailing edge sweep angle is about 15°.

In a further embodiment of any of the above airfoils, the trailing edge sweep angle is positive from 0%-95% span.

In a further embodiment of any of the above airfoils, the trailing edge sweep angle transitions from less positive to more positive at greater than an 80% span position.

In a further embodiment of any of the above airfoils, a positive-most trailing edge sweep angle is at a greater than 50% span position.

In a further embodiment of any of the above airfoils, a trailing edge sweep angle at the 0% span position and a trailing edge sweep angle at the 100% span position are about the same.

In a further embodiment of any of the above airfoils, a positive-most trailing edge sweep angle is at about a 70% span position.

In a further embodiment of any of the above airfoils, a trailing edge sweep angle is within 5° along a portion of the curve from the 0% span position to a 60% span position.

In a further embodiment of any of the above airfoils, a positive-most trailing edge sweep angle lies along the portion.

In a further embodiment of any of the above airfoils, a trailing edge sweep angle at the 0% span position and a trailing edge sweep angle at the 100% span position have a differential in a range of 40° to 50°.

In a further embodiment of any of the above airfoils, a positive-most trailing edge sweep angle is within the range of 10° to 20° in the range of 40-70% span position.

In a further embodiment of any of the above airfoils, the airfoil has a curve corresponding to a relationship between a leading edge sweep angle and a span position. A leading edge sweep angle at the 100% span position is less negative than a forward-most leading edge sweep angle along the curve. The curve has a decreasing leading edge sweep angle rate in a range of a 80-100% span position.

In a further embodiment of any of the above airfoils, the curve has a portion extending span-wise toward the tip and from the forward-most leading edge sweep angle. The portion has a decreasing leading edge sweep angle that crosses a zero sweep angle in the range of a 30-40% span position.

In a further embodiment of any of the above airfoils, the forward-most leading edge sweep angle is in a range of −10° to -15°.

In a further embodiment of any of the above airfoils, the forward-most leading edge sweep angle is about −10°.

In a further embodiment of any of the above airfoils, a rearward-most leading edge sweep angle is in a range of 15° to 30°.

In a further embodiment of any of the above airfoils, the rearward-most leading edge sweep angle is in a range of 75-85% span position.

In a further embodiment of any of the above airfoils, a leading edge sweep angle at the 0% span position and a leading edge sweep angle at the 100% span position are within 5° of one another.

In a further embodiment of any of the above airfoils, the leading edge sweep angle at the 0% span position and a leading edge sweep angle at the 100% span position are positive.

In a further embodiment of any of the above airfoils, a leading edge sweep angle at the 0% span position is negative, and a leading edge sweep angle at the 100% span position is positive.

In a further embodiment of any of the above airfoils, the leading edge sweep angle at the 0% span position and the leading edge sweep angle at the 100% span position are within 10° of one another.

In a further embodiment of any of the above airfoils, a leading edge sweep angle at the 0% span position is positive, and a leading edge sweep angle at the 100% span position is negative.

In a further embodiment of any of the above airfoils, the airfoil is a fan blade for a gas turbine engine.

In a further embodiment of the below, the array includes twenty-six or fewer fan blades. A geared architecture couples the fan section to the turbine section or the compressor section.

In one exemplary embodiment, a gas turbine engine includes a combustor section arranged between a compressor section and a turbine section. A fan section has an array of fan blades and a low fan pressure ratio of less than 1.55. The fan blades include an airfoil having pressure and suction sides. The airfoil extends in a radial direction from a 0% span position at an inner flow path location to a 100% span position at an airfoil tip. The airfoil has a curve corresponding to a relationship between a trailing edge sweep angle and a span position. The trailing edge sweep angle is in a range of 0° to 10° in a range of 10-20% span position and the trailing edge sweep angle is positive from 0% span to at least 95% span.

In a further embodiment of the above, the trailing edge sweep angle is in a range of 10° to 20° in a range of 40-70% span position.

In a further embodiment of any of the above, the low fan pressure ratio is less than about 1.52.

In a further embodiment of any of the above, the low fan pressure ratio is less than about 1.50.

In a further embodiment of any of the above, the low fan pressure ratio is less than about 1.48.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
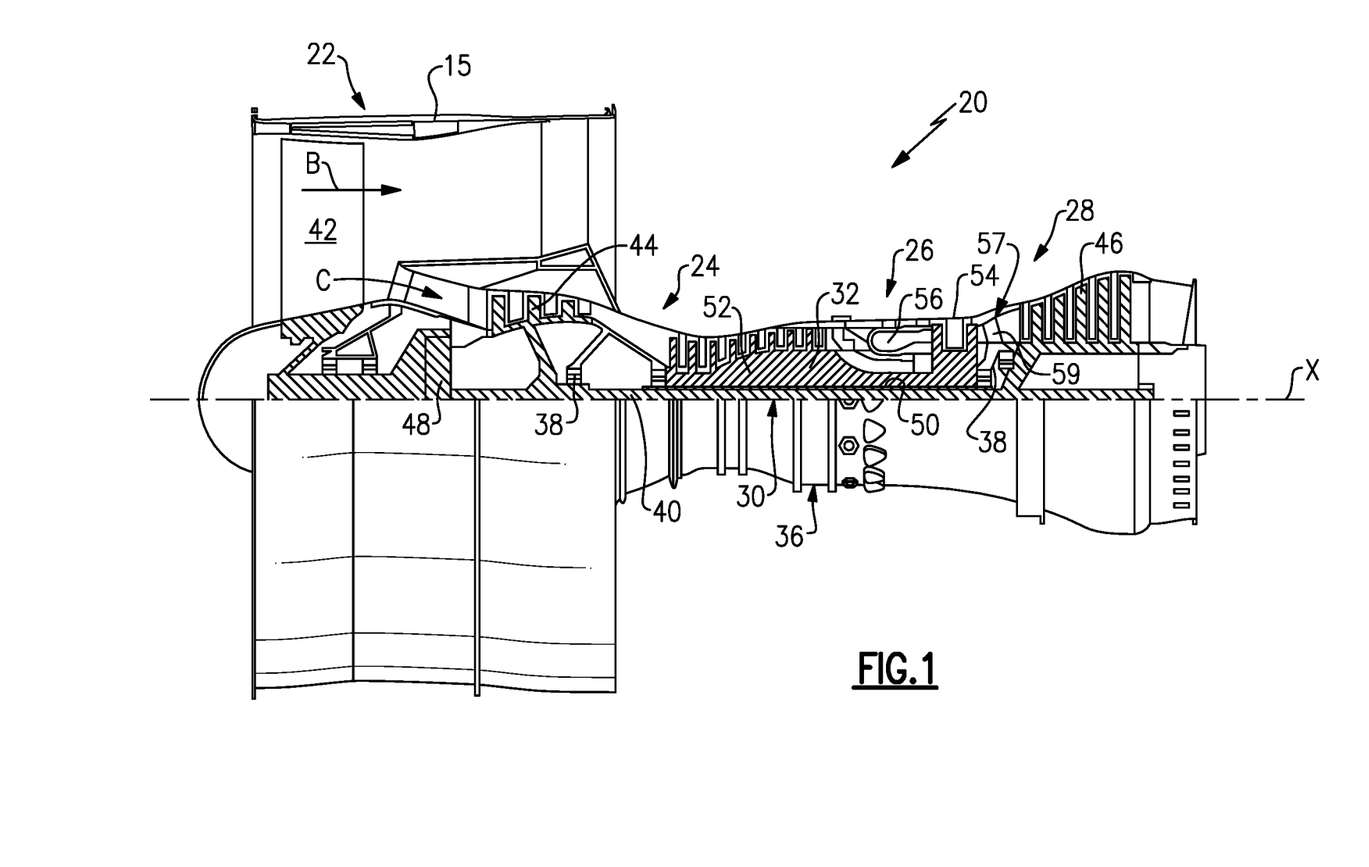
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.52. In another non-limiting embodiment the low fan pressure ratio is less than about 1.50. In another non-limiting embodiment the low fan pressure ratio is less than about 1.48. In another non-limiting embodiment the low fan pressure ratio is less than about 1.46. In another non-limiting embodiment the low fan pressure ratio is less than about 1.44. In another non-limiting embodiment the low fan pressure ratio is from 1.1 to 1.45. "Low corrected fan tip speed" is the actual fan tip speed in ft/sec divided by an industry standard temperature correction of $[(Tram\ °R)/(518.7\ °R)]^{0.5}$. The "low corrected fan tip speed" as disclosed herein according to another non-limiting embodiment is less than about 1200 ft/second.

Figure 2A:
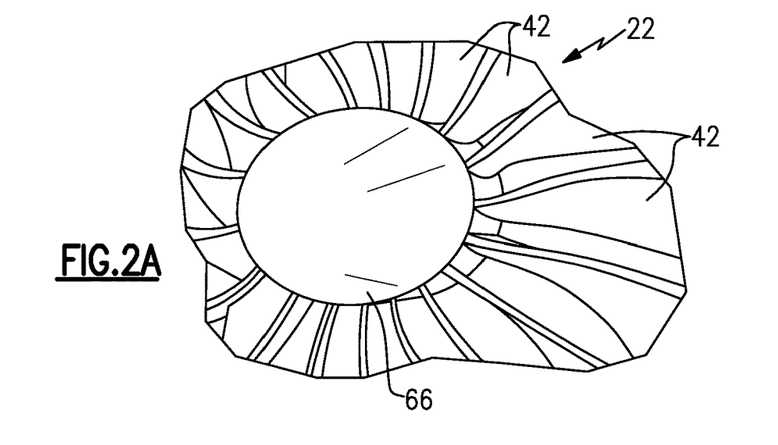
FIG. 2A is a perspective view of a portion of a fan section.
Figure 2B:
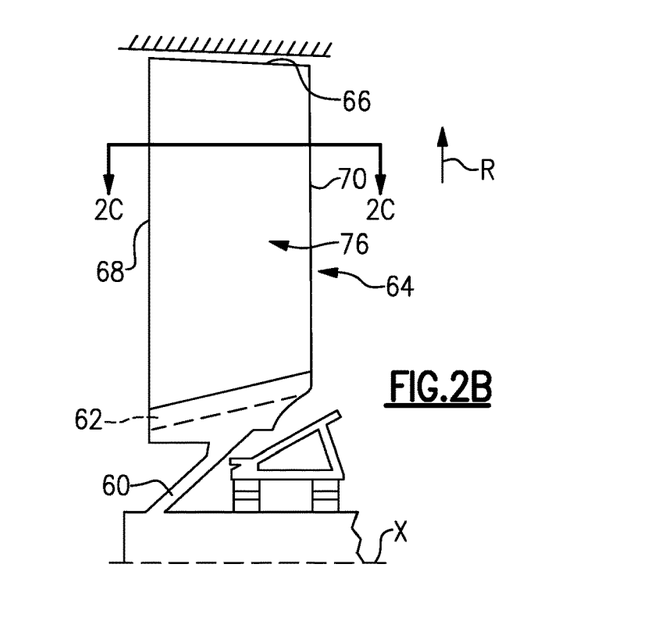
FIG. 2B is a schematic cross-sectional view of the fan section.
Figure 2C:
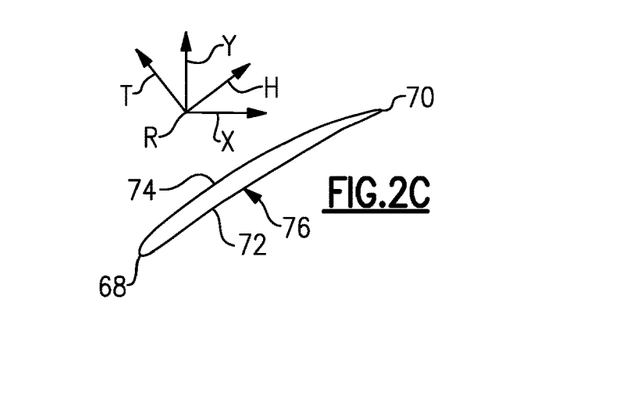
FIG. 2C is a cross-sectional view a fan blade taken along line 2C-2C in FIG. 2B.

Referring to FIG. 2A-2C, the fan blade 42 is supported by a fan hub 60 that is rotatable about the axis X. Each fan blade 42 includes an airfoil 64 extending in a radial span direction R from a root 62 to a tip 66. A 0% span position corresponds to a section of the airfoil 64 at the inner flow path (e.g., a platform), and a 100% span position corresponds to a section of the airfoil 64 at the tip 66.

The root 62 is received in a correspondingly shaped slot in the fan hub 60. The airfoil 64 extends radially outward of the platform, which provides the inner flow path. The platform may be integral with the fan blade or separately secured to the fan hub, for example. A spinner 66 is supported relative to the fan hub 60 to provide an aerodynamic inner flow path into the fan section 22.

The airfoil 64 has an exterior surface 76 providing a contour that extends from a leading edge 68 aftward in a chord-wise direction H to a trailing edge 70, as shown in FIG. 2C. Pressure and suction sides 72, 74 join one another at the leading and trailing edges 68, 70 and are spaced apart from one another in an airfoil thickness direction T. An array of the fan blades 42 are positioned about the axis X in a circumferential or tangential direction Y. Any suitable number of fan blades may be used in a given application.

The exterior surface 76 of the airfoil 64 generates lift based upon its geometry and directs flow along the core flow path C. The fan blade 42 may be constructed from a composite material, or an aluminum alloy or titanium alloy, or a combination of one or more of these. Abrasion-resistant coatings or other protective coatings may be applied to the fan blade 42. The curves and associated values assume a fan in a hot, running condition (typically cruise).

Figure 3A:
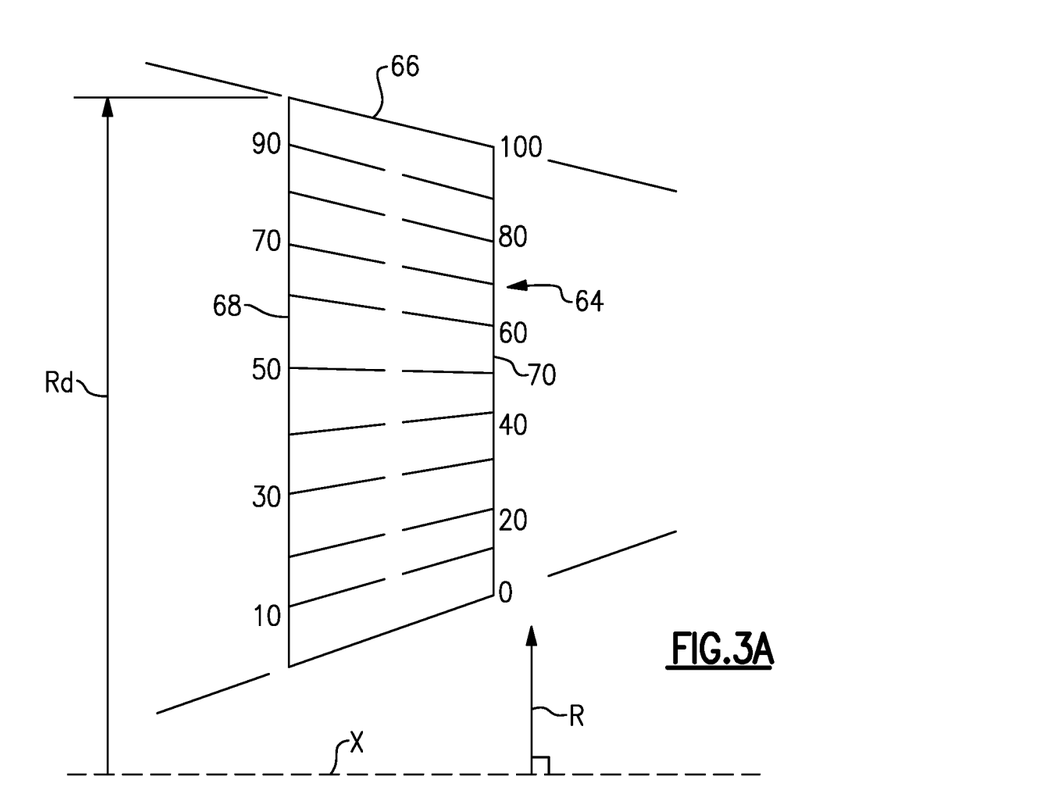
FIG. 3A is a schematic view of fan blade span positions for an airfoil without any curvature at the leading and trailing edges.

One characteristic of fan blade performance relates to the fan blade's leading and trailing edge sweep angles relative to a particular span position (R direction). Referring to FIG. 3A, span positions a schematically illustrated from 0% to 100% in 10% increments. Each section at a given span position is provided by a conical cut that corresponds to the shape of the core flow path, as shown by the large dashed lines. In the case of a fan blade with an integral platform, the 0% span position corresponds to the radially innermost location where the airfoil meets the fillet joining the airfoil to the platform. In the case of a fan blade without an integral platform, the 0% span position corresponds to the radially innermost location where the discrete platform meets the exterior surface of the airfoil. In addition to varying with span, leading and trailing edge sweep varies between a hot, running condition and a cold, static ("on the bench") condition.

Figure 3B:
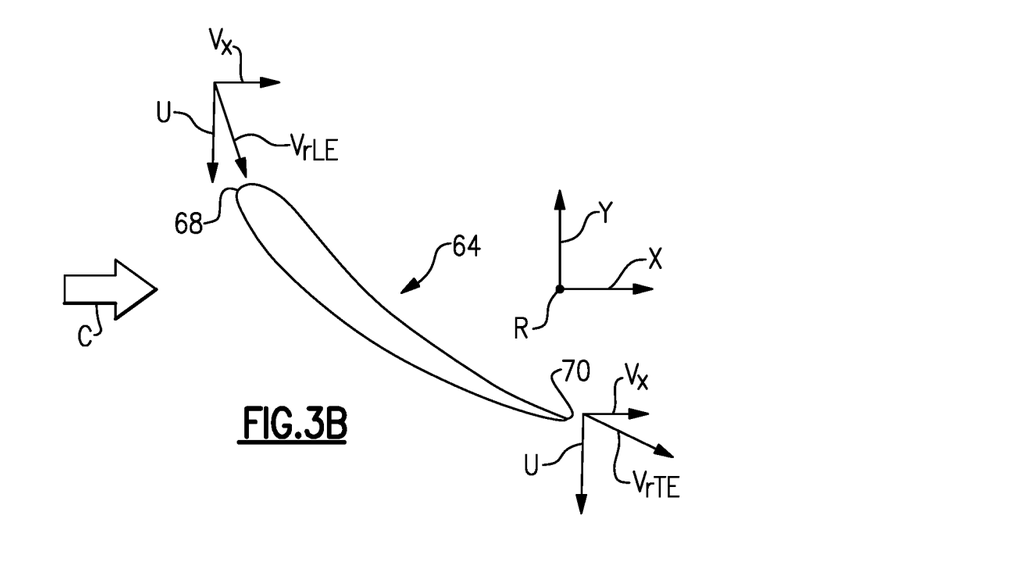
FIG. 3B is an elevational view of a fan blade airfoil illustrating velocity vectors in relation to the leading and trailing edges.

The axial velocity Vx (FIG. 3B) of the core flow C is substantially constant across the radius of the flowpath. However the linear velocity U of a rotating airfoil increases with increasing radius. Accordingly, the relative velocity Vr of the working medium at the airfoil leading edge increases with increasing radius, and at high enough rotational speeds, the airfoil experiences supersonic working medium flow velocities in the vicinity of its tip. The relative velocity at the leading edge 68 is indicated as $Vr_{EE}$, and the relative velocity at the trailing edge 70 is indicated as $Vr_{TE}$.

Figure 3C:
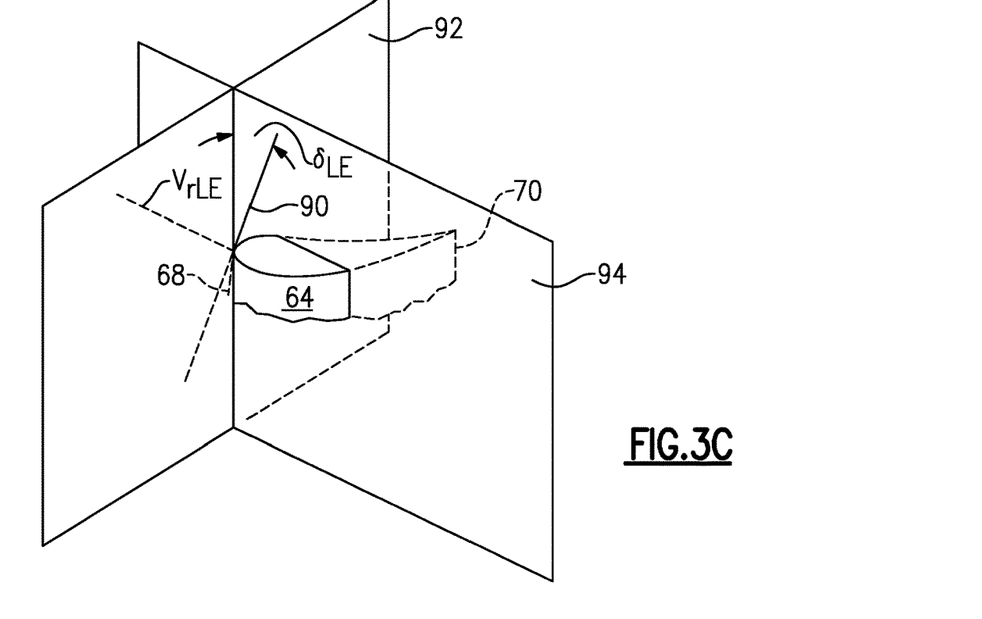
FIG. 3C is a schematic perspective view of an airfoil fragment illustrating the definition of a leading edge sweep angle.
Figure 3D:
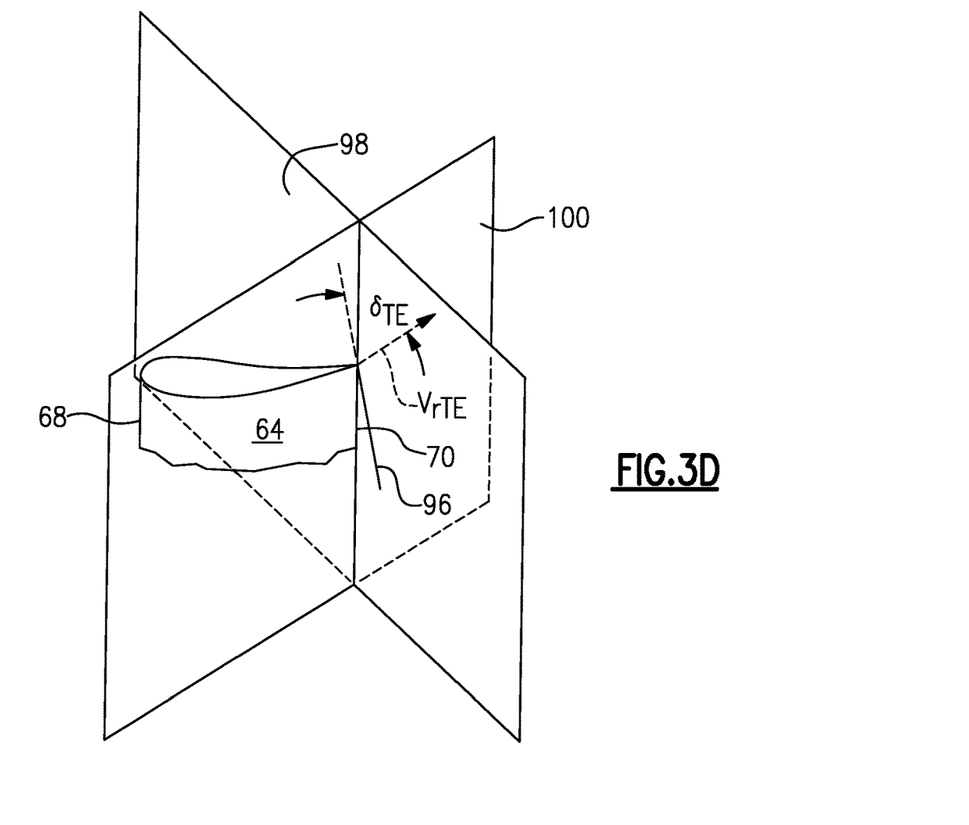
FIG. 3D is a schematic perspective view of an airfoil fragment illustrating the definition of a trailing edge sweep angle.

Supersonic flow over an airfoil, while beneficial for maximizing the pressurization of the working medium, has the undesirable effect of reducing fan efficiency by introducing losses in the working medium's total pressure. Therefore, it is typical to sweep the airfoil's leading edge over at least a portion of the blade span so that the working medium velocity component in the chordwise direction (perpendicular to the leading edge) is subsonic. Since the relative velocity Vr increases with increasing radius, the sweep angle typically increases with increasing radius as well. As shown in FIGS. 3C and 3D, the sweep angle σ at any arbitrary radius Rd (FIG. 3A) at the leading edge 68 is indicated as $\sigma_{LE}$, and at the trailing edge 70, $\sigma_{TE}$.

Figure 4A:
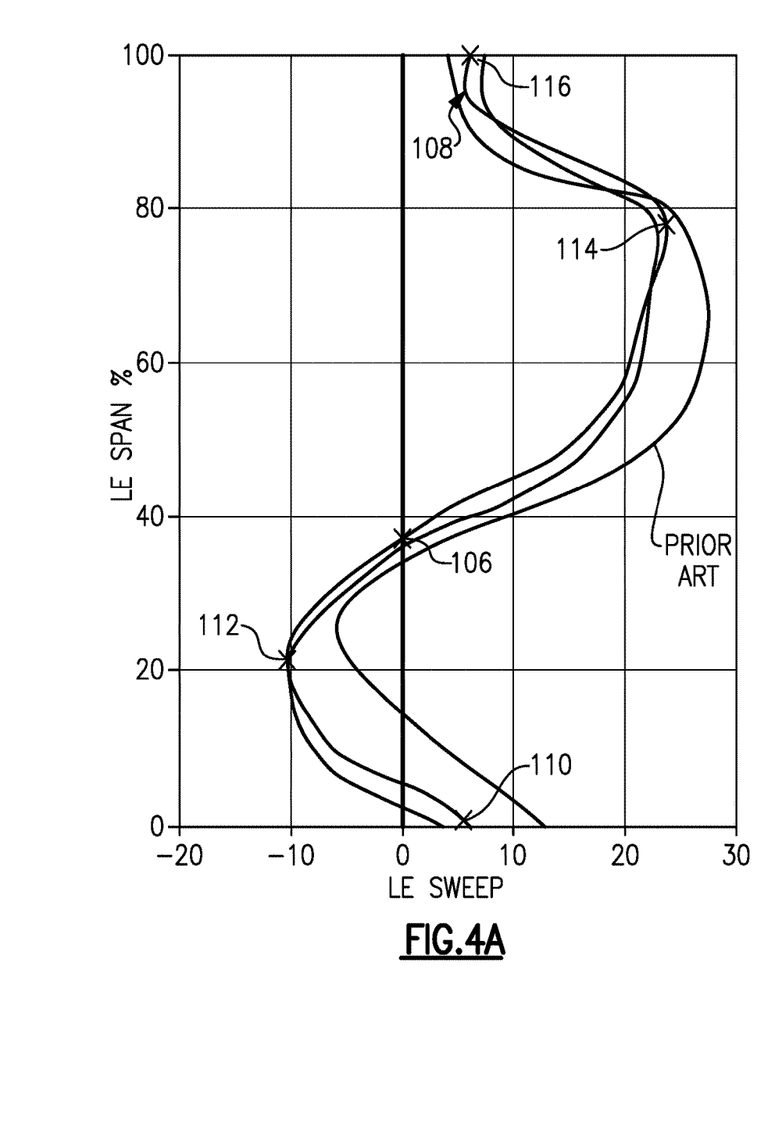
FIG. 4A graphically illustrates a leading edge sweep angle relative to a span position for a set of first example airfoils and a prior art airfoil.
Figure 5A:
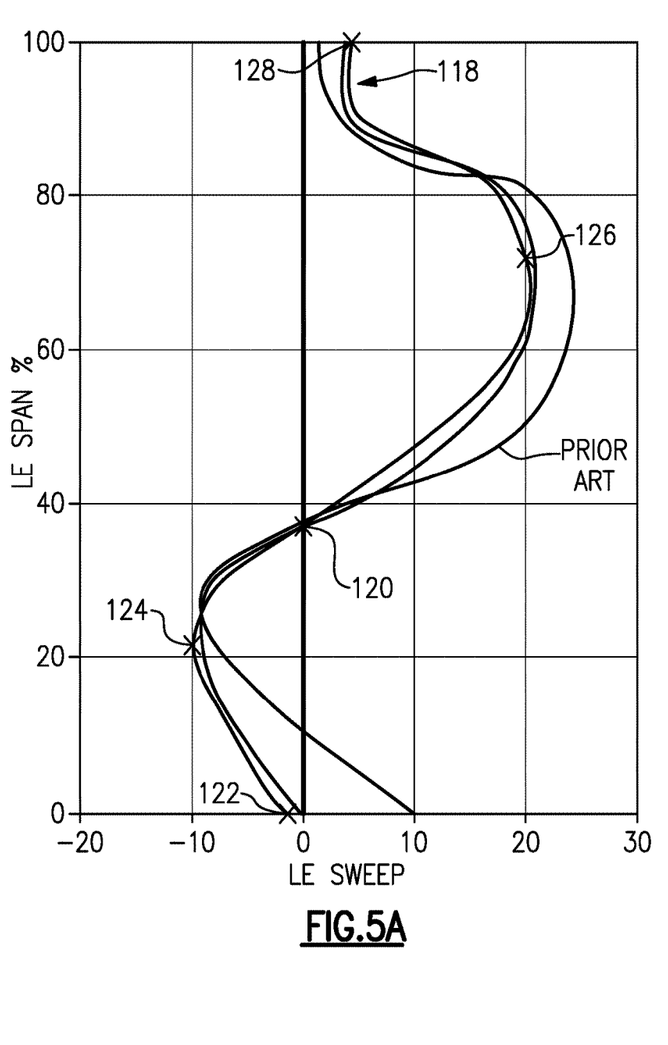
FIG. 5A graphically illustrates a leading edge sweep angle relative to a span position for a set of second example airfoils and the prior art airfoil.

Referring to FIG. 3C, the leading edge sweep angle $\sigma_{LE}$ is the acute angle between a line 90 tangent to the leading edge 68 of the airfoil 64 and a plane 92 perpendicular to the relative velocity vector $Vr_{LE}$. The sweep angle is measured in plane 94, which contains both the relative velocity vector $Vr_{LE}$ and the tangent line 90 and is perpendicular to plane 92. FIGS. 4A, and 5A are provided in conformance with this definition of the leading edge sweep angle $\sigma_{LE}$.

Figure 4B:
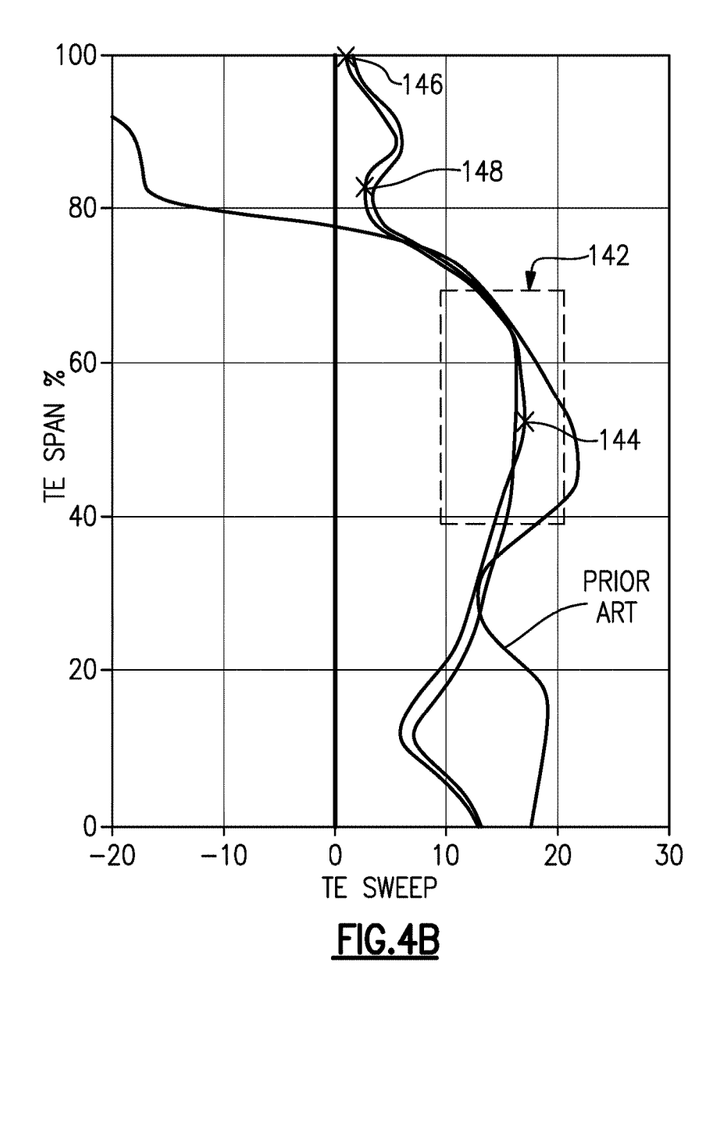
FIG. 4B graphically illustrates a trailing edge sweep angle relative to a span position for a set of first example airfoils and a prior art airfoil.
Figure 5B:
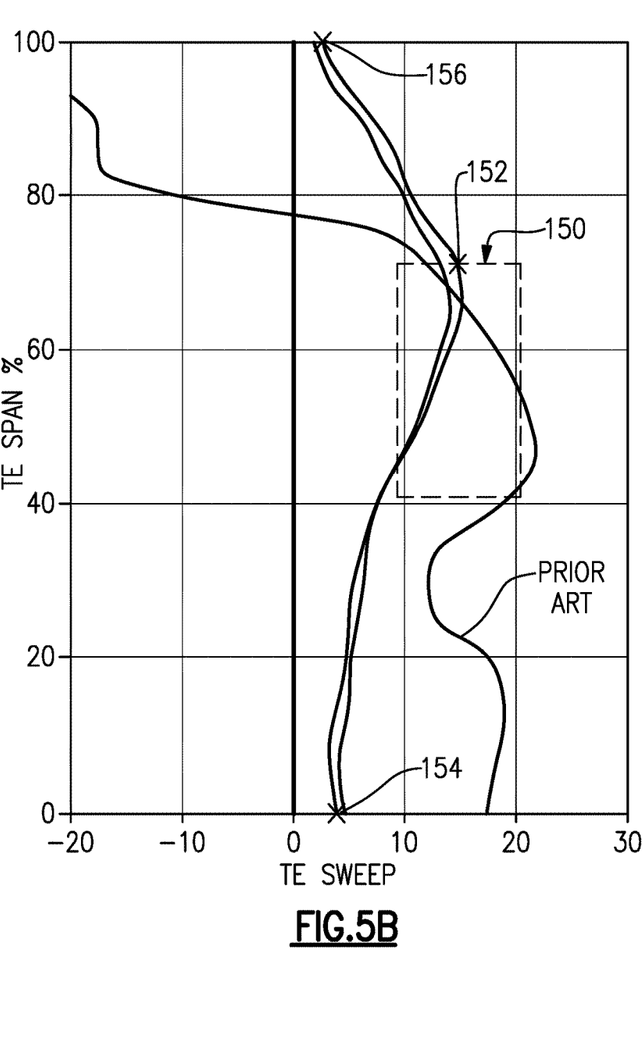
FIG. 5B graphically illustrates a trailing edge sweep angle relative to a span position for a set of second example airfoils and the prior art airfoil.

Referring to FIG. 3D, the trailing edge sweep angle $\sigma_{TE}$ is the acute angle between a line 96 tangent to the trailing edge 70 of the airfoil 64 and a plane 98 perpendicular to the relative velocity vector $Vr_{TE}$. The sweep angle is measured in plane 100, which contains both the relative velocity vector $Vr_{TE}$ and the tangent line 96 and is perpendicular to plane 98. FIGS. 4B, and 5B are provided in conformance with this definition of the trailing edge sweep angle $\sigma_{TE}$.

Thus, a negative sweep angle indicates an airfoil edge locally oriented in a direction opposite the velocity vector ($Vr_{LE}$ or $Vr_{TE}$), and a positive sweep angle indicates an airfoil edge locally oriented in the same direction as the velocity vector.

Several example fan blades are shown in each of the graphs in FIGS. 4A-5B, each blade represented by a curve. Only one curve in each graph is discussed for simplicity. Referring to FIGS. 4A and 5A, the airfoil has a curve corresponding to a relationship between a leading edge sweep angle (LE SWEEP) and a span position (LE SPAN %). The curves illustrate that a leading edge sweep angle at the 100% span position (116 in FIG. 4A; 128 in FIG. 5A) is less negative than a forward-most leading edge sweep angle (112 in FIG. 4A; 124 in FIG. 5A) along the curve. "Less negative" includes positive numbers as well as negative numbers of a smaller magnitude than the forward-most leading edge sweep angle. The curves have a decreasing leading edge sweep angle rate (108 in FIG. 4A; 118 in FIG. 5A) in a range of a 80-100% span position. That is, the sweep angle is not constant, but changes. This change, or leading edge sweep angle rate, decreases in the range of 80-100% span.

The curves have a portion extending span-wise toward the tip and from the forward-most leading edge sweep angle (112 in FIG. 4A; 124 in FIG. 5A). The forward-most leading edge sweep angle is in a range of −10° to −15°. In the examples shown in FIGS. 4A and 5A, the forward-most leading edge sweep angle is about −10°. The portion has a decreasing leading edge sweep angle that crosses a zero sweep angle (106 in FIG. 4A; 120 in FIG. 5A) in the range of a 30-40% span position.

A rearward-most leading edge sweep angle (114 in FIG. 4A; 126 in FIG. 5A) is in a range of 15° to 30°. In the example shown in FIG. 4A, the rearward-most leading edge sweep angle 114 is in a range of 75-85% span position. With continuing reference to FIG. 4A, a leading edge sweep angle 110 at the 0% span position and the leading edge sweep angle 116 at the 100% span position are within 5° of one another. Both the leading edge sweep angle at the 0% span position and the leading edge sweep angle at the 100% span position are positive.

Referring to FIG. 5A, a leading edge sweep angle 122 at the 0% span position is negative, and a leading edge sweep angle 128 at the 100% span position is positive. The leading edge sweep angle 128 at the 0% span position and the leading edge sweep angle 128 at the 100% span position are within 10° of one another.

Trailing edge sweep angles are graphically illustrated in FIGS. 4B and 5B. The airfoil has curves corresponding to a relationship between a trailing edge sweep angle and the span position. Within a region of the curve (142 in FIG. 4B; 150 in FIG. 5B), the trailing edge sweep angle (TE SWEEP) is in a range of 10° to 20° in a range of 40-70% span position (TE SPAN %). The trailing edge sweep angle is positive from 0% span to at least 95% span. In one example, the trailing edge sweep angle is in a range of 10° to 20° in a range of 50-70% span position, and in another example, the trailing edge sweep angle is in a range of 10° to 20° in a range of 60-70% span position. Within the 60-70% span position, the trailing edge sweep angle is about 15°. In the examples, a positive-most trailing edge sweep angle (144 in FIG. 4B; 152 in FIG. 5B) is within the range of 10° to 20° in the range of 40-70% span position.

Referring to FIG. 4B, the trailing edge sweep angle is positive from 0%-95% span. The trailing edge sweep angle 146 at the 100% span position is about zero, but negative. The trailing edge sweep angle transitions from less positive to more positive at greater than an 80% span position at point 148. Said another way, at point 148 the trailing edge sweep angle becomes increasingly positive for at least a portion of the curve toward the 100% span position. The positive-most trailing edge sweep angle 144 is at a greater than 50% span position.

Referring to FIG. 5B, a trailing edge sweep angle 154 at the 0% span position and a trailing edge sweep angle 156 at the 100% span position are about the same. The positive-most trailing edge sweep angle 152 is at about a 70% span position.

The leading and trailing edge sweep in a hot, running condition along the span of the airfoils 64 relate to the contour of the airfoil and provide necessary fan operation in cruise at the lower, preferential speeds enabled by the geared architecture 48 in order to enhance aerodynamic functionality and thermal efficiency. As used herein, the hot, running condition is the condition during cruise of the gas turbine engine 20. For example, the leading and trailing edge sweep in the hot, running condition can be determined in a known manner using numerical analysis, such as finite element analysis.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a turbine engine comprising:
an airfoil having pressure and suction sides and extending in a radial direction from a 0% span position at an inner flow path location to a 100% span position at an airfoil tip, wherein the airfoil has a curve corresponding to a relationship between a trailing edge sweep angle and a span position, wherein the trailing edge sweep angle is in a range of 0° to 10° in a range of 10-20% span position, and the trailing edge sweep angle is positive from 0% span to at least 95% span.

2. The airfoil according to claim 1, wherein the trailing edge sweep angle is in a range of 10° to 20° in a range of 40-70% span position.

3. The airfoil according to claim 2, wherein the trailing edge sweep angle is about 15°.

4. The airfoil according to claim 1, wherein the trailing edge sweep angle is positive from 0%-95% span.

5. The airfoil according to claim 4, wherein the trailing edge sweep angle transitions from less positive to more positive at greater than an 80% span position.

6. The airfoil according to claim 4, wherein a positive-most trailing edge sweep angle is at a greater than 50% span position.

7. The airfoil according to claim 1, wherein a trailing edge sweep angle at the 0% span position and a trailing edge sweep angle at the 100% span position are about the same.

8. The airfoil according to claim 7, wherein a positive-most trailing edge sweep angle is at about a 70% span position.

9. The airfoil according to claim 1, wherein a trailing edge sweep angle is within 5° along a portion of the curve from the 0% span position to a 60% span position.

10. The airfoil according to claim 9, wherein a positive-most trailing edge sweep angle lies along the portion.

11. The airfoil according to claim 9, wherein a trailing edge sweep angle at the 0% span position and a trailing edge sweep angle at the 100% span position have a differential in a range of 40° to 50°.

12. The airfoil according to claim 1, wherein a positive-most trailing edge sweep angle is within the range of 10° to 20° in the range of 40-70% span position.

13. The airfoil according to claim 1, wherein the airfoil has a curve corresponding to a relationship between a leading edge sweep angle and a span position, wherein a leading edge sweep angle at the 100% span position is less negative than a forward-most leading edge sweep angle along the curve, and wherein the curve has a decreasing leading edge sweep angle rate in a range of a 80-100% span position.

14. The airfoil according to claim 13, wherein the curve has a portion extending span-wise toward the tip and from the forward-most leading edge sweep angle, the portion has a decreasing leading edge sweep angle that crosses a zero sweep angle in the range of a 30-40% span position.

15. The airfoil according to claim 14, wherein the forward-most leading edge sweep angle is in a range of −10° to −15°.

16. The airfoil according to claim 15, wherein the forward-most leading edge sweep angle is about −10°.

17. The airfoil according to claim 15, wherein a rearward-most leading edge sweep angle is in a range of 15° to 30°.

18. The airfoil according to claim 17, wherein the rearward-most leading edge sweep angle is in a range of 75-85% span position.

19. The airfoil according to claim 14, wherein a leading edge sweep angle at the 0% span position and a leading edge sweep angle at the 100% span position are within 5° of one another.

20. The airfoil according to claim 19, wherein the leading edge sweep angle at the 0% span position and a leading edge sweep angle at the 100% span position are positive.

21. The airfoil according to claim 14, wherein a leading edge sweep angle at the 0% span position is negative, and a leading edge sweep angle at the 100% span position is positive.

22. The airfoil according to claim 21, wherein the leading edge sweep angle at the 0% span position and the leading edge sweep angle at the 100% span position are within 10° of one another.

23. The airfoil according to claim 2, wherein a leading edge sweep angle at the 0% span position is positive, and a leading edge sweep angle at the 100% span position is negative.

24. The airfoil according to claim 1, wherein the airfoil is a fan blade for a gas turbine engine.

25. A gas turbine engine comprising:
a combustor section arranged between a compressor section and a turbine section;
a fan section has an array of fan blades and a low fan pressure ratio of less than 1.55; and
wherein the fan blades include an airfoil having pressure and suction sides, the airfoil extends in a radial direction from a 0% span position at an inner flow path location to a 100% span position at an airfoil tip, wherein the airfoil has a curve corresponding to a relationship between a trailing edge sweep angle and a span position, wherein the trailing edge sweep angle is in a range of 0° to 10° in a range of 10-20% span position, and the trailing edge sweep angle is positive from 0% span to at least 95% span.

26. The gas turbine engine according to claim 25, wherein the array includes twenty-six or fewer fan blades; and
a geared architecture couples the fan section to the turbine section or the compressor section.

27. The gas turbine engine according to claim 26, wherein the trailing edge sweep angle is in a range of 10° to 20° in a range of 40-70% span position.

28. The gas turbine engine according to claim 26, wherein the low fan pressure ratio is less than 1.52.

29. The gas turbine engine according to claim 28, wherein the low fan pressure ratio is less than 1.50.

30. The gas turbine engine according to claim 29, wherein the low fan pressure ratio is less than 1.48.

* * * * *